US006823271B1

(12) United States Patent
Foss

(10) Patent No.: US 6,823,271 B1
(45) Date of Patent: Nov. 23, 2004

(54) MULTI-PHASE FLOW METER FOR CRUDE OIL

(75) Inventor: Gary C. Foss, Renton, WA (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 10/611,216

(22) Filed: Jun. 30, 2003

(51) Int. Cl.[7] .......................... G01F 17/00; G01F 1/74
(52) U.S. Cl. ..................................... 702/50; 73/861.04
(58) Field of Search ........................ 702/50; 73/861.14, 73/861.04

(56) References Cited

U.S. PATENT DOCUMENTS

| | | | |
|---|---|---|---|
| 4,751,842 A | * 6/1988 | Ekrann et al. | ............. 73/61.44 |
| 5,095,758 A | 3/1992 | Cox et al. | |
| 5,127,272 A | 7/1992 | Dean et al. | |
| 5,249,455 A | 10/1993 | Cox | |
| 5,259,239 A | 11/1993 | Gaisford | |
| 5,272,444 A | 12/1993 | Cox | |
| 5,287,752 A | * 2/1994 | Den Boer | ................ 73/861.04 |
| 5,770,805 A | * 6/1998 | Castel | ..................... 73/861.04 |
| 6,076,049 A | 6/2000 | Lievois et al. | |
| 6,234,030 B1 | 5/2001 | Butler | |
| 6,292,756 B1 | 9/2001 | Lievois et al. | |
| 6,318,156 B1 | 11/2001 | Dutton et al. | |
| 6,318,172 B1 | 11/2001 | Byatt et al. | |
| 6,332,111 B1 | * 12/2001 | Fincke | ........................ 702/50 |
| 6,467,358 B1 | * 10/2002 | Nishi et al. | ............. 73/861.04 |
| 6,655,221 B1 | * 12/2003 | Aspelund et al. | ........ 73/861.04 |

OTHER PUBLICATIONS

Whitaker, T.S., Multiphase Flow Measurement: Current and Future Developments, 1996, The Institution of Electrical Engineers, UK.*
Thorn et al., Recent Developments in Three–Phase Flow measurement, 1997, Meas. Sci. Technol., vol. 8, pp. 691–701.*
Toral et al., Field Tests of the Esmer Multiphase Flowmeter, 16th North Sea Flow Measurement Workshop 1998.*
Jaworski et al., A Portable capacitance probe for Detection of Interface Levels in Multi–Phase Flows–A case Study, Apr. 14–17, 1999, 1st World Congress on Industrial Process Tomography, pp. 289–296.*

* cited by examiner

Primary Examiner—John Barlow
Assistant Examiner—Toan M. Le
(74) Attorney, Agent, or Firm—Black Lowe & Graham; Dale C. Barr

(57) ABSTRACT

An apparatus, systems, and method for measuring an amount of oil in a flow of fluid at varying depths of the flow of fluid are provided. A support structure is configured to be submerged in a flow of fluid and to support a plurality of sensors. A plurality of sensor arrays is disposed on the support structure with each of the sensor arrays being disposed at positions corresponding to varying depths of the flow of fluid and being configured to measure properties of a localized flow of fluid. Each of the sensor arrays includes a capacitance sensor being configured to respond to a localized capacitance of the localized flow of fluid adjacent to the capacitance sensor. Each of the sensor arrays also includes a conductance sensor configured to measure a localized conductance of the localized flow of fluid.

73 Claims, 4 Drawing Sheets

MULTI-PHASE FLOW METER FOR CRUDE OIL

FIELD OF THE INVENTION

This invention relates generally to oil drilling and, more specifically, to measuring an amount of oil produced by a well.

BACKGROUND OF THE INVENTION

Production of oil and related petrochemicals generally begins with drilling wells into the Earth's crust to tap underground oil reserves. Drilling oil wells represents a considerable investment because the wells often must be drilled in remote locations and/or be drilled very deeply to reach oil. Moreover, the investment is a risky proposition because the drilling may not reach oil.

Considering how expensive and risky it is to drill oil wells, maintaining the wells is an important concern. If a well stops being productive, it is desirable to shut down the well rather than wastefully invest in its continued operation. Thus, it is desirable to monitor a well's production to determine whether it continues to be a viable well. Even more importantly, it is desirable to monitor a well's production to prevent a productive well from being lost. On occasion, a well's production may decline sharply if the well should become blocked or otherwise impeded. If timely action is taken to address the impediment, the well can continue to be productive. On the other hand, without timely action, the well can be lost permanently, resulting in a waste of the investment to drill and maintain the well to that point.

Monitoring a well's production to review its viability or prevent loss of the well is not a simple proposition. The output of such wells usually includes not only oil, but, also natural gas, water, and other substances. It is not desirable to invest in continued operation of an oil well that is yielding only water. More importantly, a formerly oil-producing well beginning to increasingly yield water may indicate a serious problem. If the problem is left untreated, the well could be lost.

A flow meter alone may indicate that the well is producing when, in fact, the well is producing only water. As a result, a more precise form of monitoring is desired. Unfortunately, valuable oil can exist in many different consistencies ranging from a prototypical thick, black crude to a very thin, gasoline-like fluid. Thus, successfully augmenting the flow meter to determine production of oil is not as simple as gauging the thickness of a flow of fluid being produced. An accurate assessment of the percentage of the water contained in the flow of fluid, known as a "water cut," is desired to be able to actually assess the well's production.

To address this need, a number of different technologies have been devised to measure oil production. Unfortunately, these technologies tend to involve devices that are expensive, large, delicate, and highly sophisticated. For example, oil measuring devices using gamma rays or microwaves can monitor a flow of fluid drawn from a well and accurately gauge the amount of oil contained in that flow. Unfortunately, these devices also present a number of drawbacks, foremost of which is that these devices tend to be very expensive. As a result, it is not practical to acquire such a device for each well to continually monitor the well's production. Typically, these devices are moved around to periodically spot-check various wells. Moving these devices around in itself is a problem because the equipment is large and heavy, and must be carried by truck from site to site. Unfortunately, by the time a well is due for spot-check and the equipment is moved on-site, a permanent problem may have arisen resulting in the well already having been lost.

Current technologies also present other concerns. Devices using radiation, to name one example, can be sensitive and require sophisticated care for routine upkeep. Moreover, radiation devices beyond a certain nominal output need to be licensed and regulated, adding to the complexity of their use. Moreover, such devices, used improperly, can present an environmental or human hazard.

To improve on these technologies, researchers have focused on ways to separate oil from foreign matter, natural gas, water, and other substances in the well. If the oil can be separated, then it can be a relatively simple matter to gauge a quantity of oil being produced. Given time, this separation is not a problem. Foreign matter can be separated from the oil by passing it through a filtering medium, comparable with the way that foreign matter is filtered from an automobile's oil supply by passing the automobile's oil through an oil filter. Separating the natural gas also is usually not difficult, because the less dense natural gas expands and rises out of the oil. In addition, given time, mixed oil and water also will separate themselves. Oil has a lesser density than water. Thus, if mixed oil and water are left in a collection tank, the oil will rise to the top and the water will sink to the bottom. The oil can then be collected by siphoning the oil off the top of the tank, or the water can be drained from the bottom of the tank, leaving only the oil in the tank. However, it may not be practical to allow enough time for mixed oil and water to separate themselves. Further, faster technologies to separate oil from other fluids and substances continue to prove to be complicated, difficult, and/or costly.

Thus, there is unmet need in the art for a better, cheaper, and safer way to measure an amount of oil contained in a flow of fluid extracted from an oil well.

SUMMARY OF THE INVENTION

The present invention provides an apparatus, system, and method for inexpensive and reliable measurement of an amount of oil within a flow of fluid extracted from a well. In general, capacitance of a fluid represents a good measure of a relative amount of oil contained in the flow of fluid when the flow of fluid contains approximately not less than one-half oil, although capacitance does not provide as helpful of a measure for fluids that are less than one-half oil. On the other hand, conductance of a fluid generally represents a good measure of a relative amount of oil contained in the flow of fluid when the flow of fluid contains approximately not more than one-half oil, although conductance does not provide as clear a measure for fluids that are more than one-half oil. Thus, combining measurement of capacitance and conductance provides a good measure of the relative amount of oil and water in a flow of fluid regardless of the relative percentage of each contained in the flow of fluid. Embodiments of the present invention measure capacitance and conductance of a flow of fluid at varying depths in the flow of fluid for obtaining an accurate measure of the amount of oil contained in the flow of fluid.

More particularly, embodiments of the present invention provide an apparatus, systems, and method for measuring an amount of oil in a flow of fluid at varying depths of the flow of fluid. A support structure is configured to be submerged in a flow of fluid and to support a plurality of sensors. A plurality of sensor arrays is disposed on the support structure with each of the sensor arrays being disposed at positions corresponding to varying depths of the flow of fluid and being configured to measure properties of a localized flow of fluid. Each of the sensor arrays includes a capacitance sensor including one or more capacitance sensors being configured to respond to a localized capacitance of the localized flow of fluid adjacent to the capacitance sensor with the capacitance sensor being coupled to a pair of conductors. Each of the sensor arrays also includes a conductance sensor configured to measure a localized conductance of the localized flow of fluid, the conductance sensor being configured to generate a conductance signal. The local capacitance and the conductance signal generated by each of the sensor arrays can be used to assess the relative proportions of oil and water in the flow of fluid at varying depths in the flow of fluid.

In accordance with still further aspects of the invention, the capacitance and conductance signals can be digitized and provided to a computing module configured to calculate the proportion of oil in the localized flow of fluid. The computing module is configured to use the capacitance to calculate the localized relative amount of oil in the localized flow of fluid when no less than one-half of the localized flow of fluid includes oil, and to use the conductance to calculate the localized relative amount of oil in the localized flow of fluid when approximately not more one-half of the localized flow of fluid includes oil. Additional sensors can be used to measure other fluid properties such that the computing module can adjust the amount of oil calculations to reflect these properties. A telemetry module can be configured to communicate the amount of oil to a data collection system.

BRIEF DESCRIPTION OF THE DRAWINGS

The preferred and alternative embodiments of the present invention are described in detail below with reference to the following drawings.

DETAILED DESCRIPTION OF THE INVENTION

By way of overview, embodiments of the present invention provide an apparatus, systems, and method for measuring an amount of oil in a flow of fluid at varying depths of the flow of fluid. A support structure is configured to be submerged in a flow of fluid and to support a plurality of sensors. A plurality of sensor arrays is disposed on the support structure with each of the sensor arrays being disposed at positions corresponding to varying depths of the flow of fluid and being configured to measure properties of a localized flow of fluid. Each of the sensor arrays includes a capacitance sensor including at least one capacitance sensor being configured to respond to a localized capacitance of the localized flow of fluid adjacent to the capacitance sensor with the capacitance sensor being coupled to a pair of conductors. Each of the sensor arrays also includes a conductance sensor configured to measure a localized conductance of the localized flow of fluid, the conductance sensor being configured to generate a conductance signal. The local capacitance and the local conductance signal generated by each of the sensor arrays can be used to assess the relative proportions of oil and water in the flow of fluid at varying depths in the flow of fluid.

Figure 1:
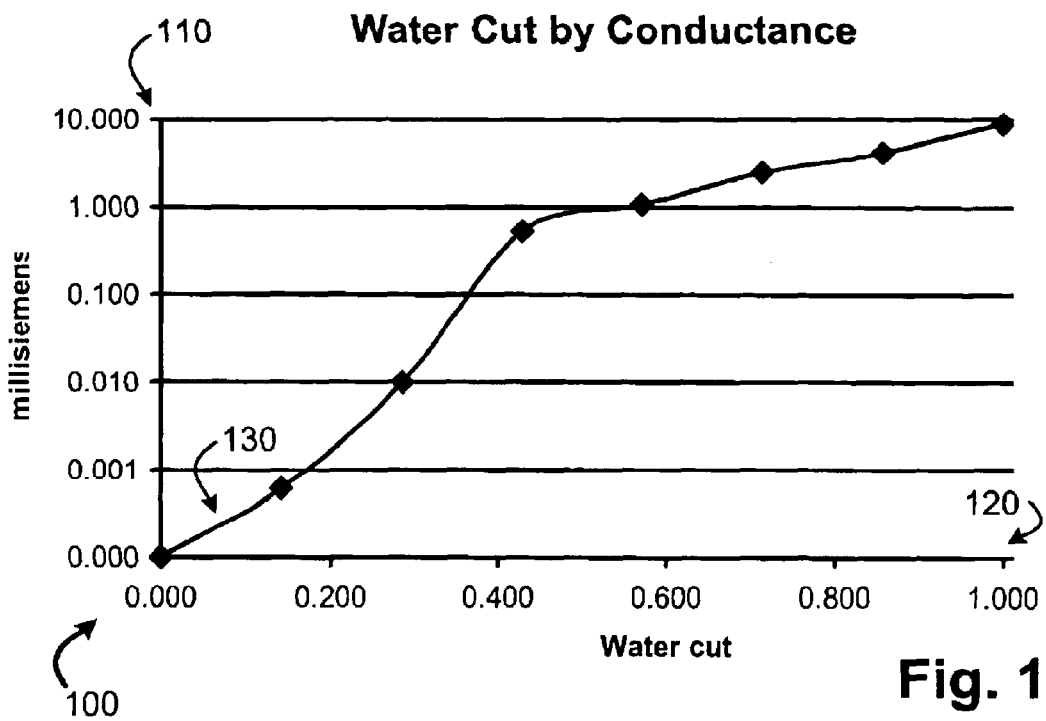
FIG. 1 is a graph of conductance versus a fractional amount of water in a flow of fluid including oil and water.

Referring to FIG. 1, a graph 100 plots conductance versus a fractional amount of water, or "Avater cut," in a flow of fluid including oil and water. The water component of the flow of fluid drawn from an oil well has a salinity level comparable to sea water and, thus, is conductive. By contrast, oil is not conductive. Thus, the relative proportion of oil to water in the flow of fluid can be determined by measuring the conductance of the flow of fluid. The graph 100 plots on a logarithmically-scaled vertical axis 110 conductance of a flow of fluid measured in millisiemens for a fractional amount of water plotted on the horizontal axis 120. The fractional amount of water plotted ranges from no water to all water. As can be seen from the graph 100, a curve 130 plotting the conductance has a fairly linear slope in the range of one-half water to approximately all water. On the other hand, for fluids having less than one-half water, the fluid may not conduct consistently or may not conduct at all. As the fluid becomes not at all conductive where there is almost no water or no water in the flow of fluid, resistance of the flow of fluid rises sharply, and conductance becomes a poor standard by which to measure the relative amounts of oil and water in the flow of fluid. Put another way, in a flow of fluid including oil and water, conductance accurately differentiates an amount of oil in a flow of fluid containing approximately less than one-half oil.

Figure 2:
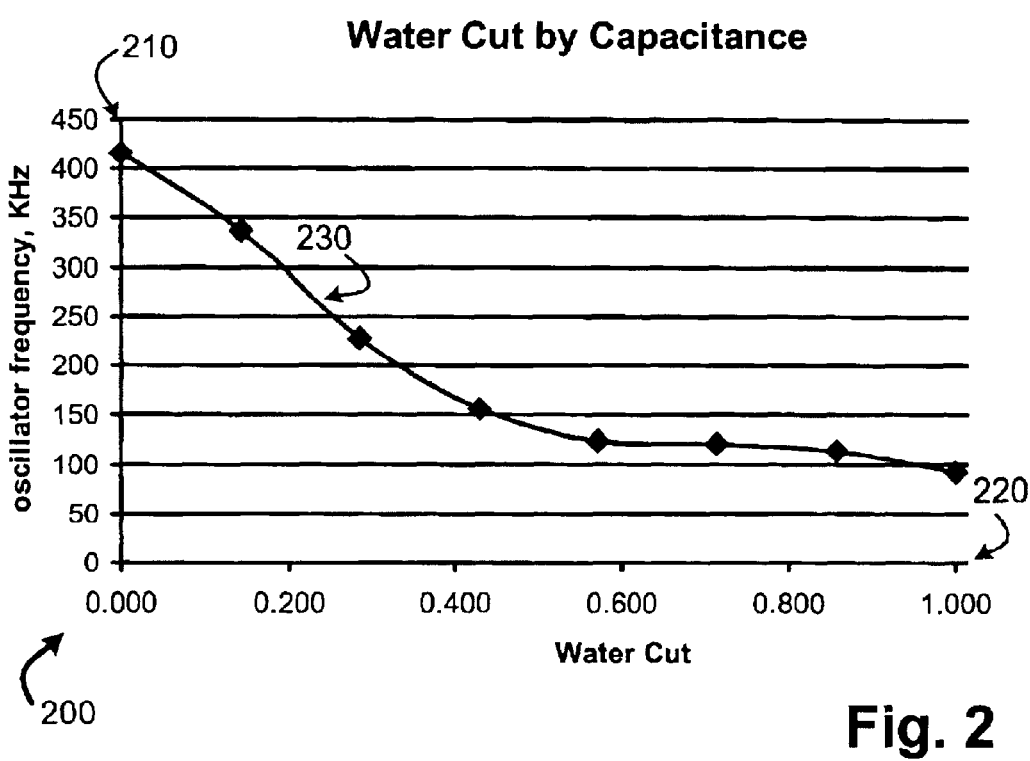
FIG. 2 is a graph of capacitance versus a fractional amount of water in a flow of fluid including oil and water.

Referring now to FIG. 2, a graph 200 plots capacitance versus a fractional amount of water in a flow of fluid including oil and water. Oil is a known dielectric while water is not dielectric. Attempting to measure the capacitance of the flow of fluid effectively makes the flow of fluid the capacitor in a RC oscillator circuit which yields a self-excited oscillation. A changing capacitance value changes the frequency of that oscillation. Because the relative amount of oil in the flow of fluid changes the capacitance of the fluid, the relative amount of oil in the flow of fluid changes the oscillation measured. The oscillation frequency representing capacitance of the fluid is plotted against a fractional amount of water plotted on the horizontal axis 220. As in the graph 100 (FIG. 1), the fractional amount of water plotted ranges from no water to all water. As can be seen from the graph 200, a curve 230 plotting the capacitance has a fairly linear slope in a range between approximately no water and one-half water, but the slope flattens out with further increasing amounts of water. As the relative amount of water in the flow of fluid increases, the flow of fluid tends to become more of a conductor, and its capacitance becomes less of a useful measure of the amount of oil in the flow of fluid. Thus, capacitance differentiates fractional amounts of water for flows of fluid containing no more than approximately one-half water. Viewed another way, in a flow of fluid including oil and water, capacitance differentiates an amount of oil in the flow of fluid including up to approximately one-half oil.

Because the conductance and capacitance provide useful, complementary measures of the relative percentages of water and oil in a flow of fluid including both, according to the present invention, measuring both conductance and capacitance advantageously provides a useful way to measure the relative percentages of water and oil in the flow of fluid. When the measurements of one or both of conductance or capacitance indicate that the flow of fluid is less than approximately one-half oil, conductance is selected as the principal measure of the relative percentage of oil in the flow of fluid. On the other hand, when the measurements of one or both of conductance or capacitance indicates that the flow of fluid is not less than approximately one-half oil, capacitance is selected as the principal measure of the relative amount of oil in the flow of fluid. Measuring both quantities and selecting the more applicable measure for the composition of the flow of fluid advantageously allows for an accurate measurement regardless of the proportions of oil and water in the flow of fluid.

Figure 3:
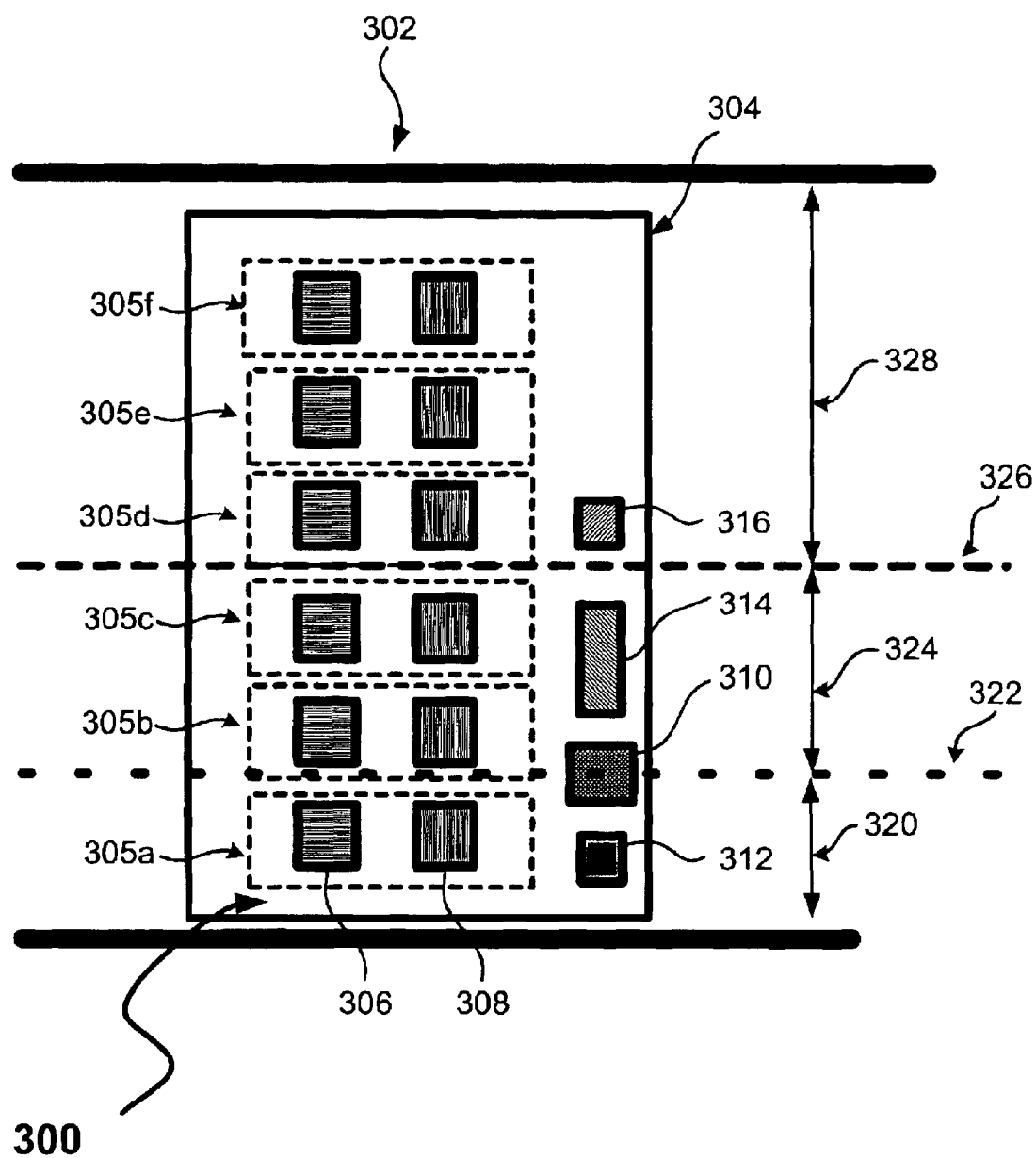
FIG. 3 is a block diagram of a measuring device according to an embodiment of the present invention.

FIG. 3 is a block diagram of a measuring device 300 according to an embodiment of the present invention deployed in pipeline 302 carrying a flow of fluid. Embodiments of the measuring device 300 include a support structure 304 configured to support a plurality of sensors. In one presently preferred embodiment, the support structure 304 is a circuit board configured to support a plurality of sensors and provide electrical connectivity between the sensors and output signal lines (not shown). The sensors are grouped in sensor arrays 305a–f.

Each of the sensor arrays 305a–f supported by the support structure 304 includes a plurality of capacitance sensors 306, each of which includes at least one capacitance sensor to measure a localized capacitance of a local flow of fluid at varying depths of the flow of fluid passing through the pipeline 302.

Each of the capacitance sensors 306 are coupled with conductors (not shown) through which the localized capacitance of the localized flow of fluid is measured. As previously described in connection with FIG. 2, a flow of fluid including oil yields an oscillating signal in proportion to the capacitance of the flow of fluid. As a result, the capacitance of the flow of fluid can be measured by creating RC oscillator circuits through the capacitance sensors 306.

Each of the sensor arrays 305a–f also includes a conductance sensor 308. In one presently preferred embodiment, the conductance sensor 308 also is an insulated device. A conductance sensor 308 may employ non-insulated electrodes. However, because of salinity of the water expected in the flow of fluid which can corrode non-insulated electrodes, an insulated device is preferable. The conductance sensor 308 suitably may be an AC capacitance sensor which, through application of an alternating signal, measures conductance of a flow of fluid adjacent to the conductance sensor. An output signal of the conductance sensor 308 (not shown) allows for the conductance to be measured for determining the proportional composition of the flow of fluid.

It will be appreciated that the capacitance sensor 306 and the conductance sensor 308 could be a single device. Adding appropriate supporting circuitry, appropriate signals can measure capacitance and conductance through electrodes of a single device. In such a configuration, the unified sensor would alternate between being a capacitance sensor 306 and a conductance sensor 308 depending on a mode directed by the supporting circuitry.

One embodiment of the measuring device 300 involves only sensor arrays 305a–f including a capacitance sensor 306 and a conductance sensor 308. Conductors (not shown) coupled with the capacitance sensor 306 and the conductance sensor 308 allow for the localized capacitance and localized conductance of the localized flow of fluid to be measured to determine a relative amount of oil in the fluid at varying depths where each of the sensor arrays 305a–f are positioned.

If desired in other embodiments of the present invention, additional sensors allow for measurements to be made of the total amount of fluid passing through the pipeline 302 and to adjust such measurements for pressure, density, temperature, or other factors. For example, a flow sensor 310 disposed on the support structure 304 suitably is a calorimetric flow sensor or other, similar device operable to monitor a rate of the flow of fluid. An output (not shown) of the flow sensor 310 indicating the rate of the flow of fluid can be combined with relative proportion measurements yielded by the plurality of capacitance sensors 306 and the plurality of conductance sensors 308 to determine a total flow rate of oil in the flow of fluid. In other words, the localized capacitance and localized conductance of the localized flow of fluid at varying depths can be totaled to determine what proportion of the flow of fluid is oil, and multiplying that proportion by the total rate of flow yields the total rate of flow of oil passing the measuring device 300 in the pipeline.

The total rate of flow of oil can be affected by pressure, density, and temperature of the flow of fluid. Accordingly, if a measurement adjusted for these variables is desired, the measuring device 300 can include sensors to measure these properties and the resulting measurement can be used to adjust the measurements previously calculated. A pressure sensor 312 can be deployed on the support structure 304 to gauge the pressure of the flow. The pressure sensor 312 suitably is one of a number of types. A microelectronic machined silicon (MEMS) sensor having an integrated circuit including a sensing element and measuring electronics can be used. Alternatively, a piezoresistive sensor, or any other suitable pressure-sensing device may be used. A temperature sensor 314 can be disposed on the support structure 304 to measure the temperature of the flow of fluid. The temperature sensor 314 suitably is a thermocouple or other similar temperature-sensing device. A density probe 316 also can be deployed on the support structure 304 to measure the density of the flow of fluid. The density probe 316 may be a nuclear density probe or another suitable device. Each of these sensors is coupled with suitable signal lines that can be coupled to a computing device to collect their measurements such that they can be applied to adjust the measurements previously collected. Multiple flow rate sensors 310, pressure sensors 312, temperature sensors 314, and density sensors 316 can be deployed to gauge localized properties within the localized flows of fluid if desired.

Using multiple sensor arrays 305a–f each having a capacitance sensor 306 and a conductance sensor 308 allows localized flows of fluid to be evaluated, thereby providing for greater accuracy in a flow of fluid not having homogeneous proportionality through its depths. For purposes of illustration, FIG. 3 depicts three differently-proportioned localized flows of fluid in the pipeline 302: a first localized flow 320 separated by a first demarcation line 322 from a second localized flow 324 which, in turn, is separated from a third localized flow 328 by a second demarcation line 326. As is shown in FIG. 3, one sensor array 305a is disposed in the first localized flow 320, two sensor arrays 305b and 305c are disposed in the second localized flow 324, and three sensor arrays 305d, 305e, and 305f are disposed in the third localized flow 328. As a result, readings of the proportions of each of the localized flows 320, 324, and 328 are collected. As will be appreciated, because twice as many sensor arrays (305b and 305c) are disposed in the second localized flow 324 as there are sensor arrays (305a) in the first localized flow 320, and three times as many sensors arrays (305d, 305e, and 305f) are disposed in the third localized flow 328 as in the first localized flow 320 (305a), the flow proportion measures will be weighted proportionately, advantageously providing a weighted composite proportion of oil in the flow of fluid including the localized flows of fluid 320, 324, and 328.

Figure 4:
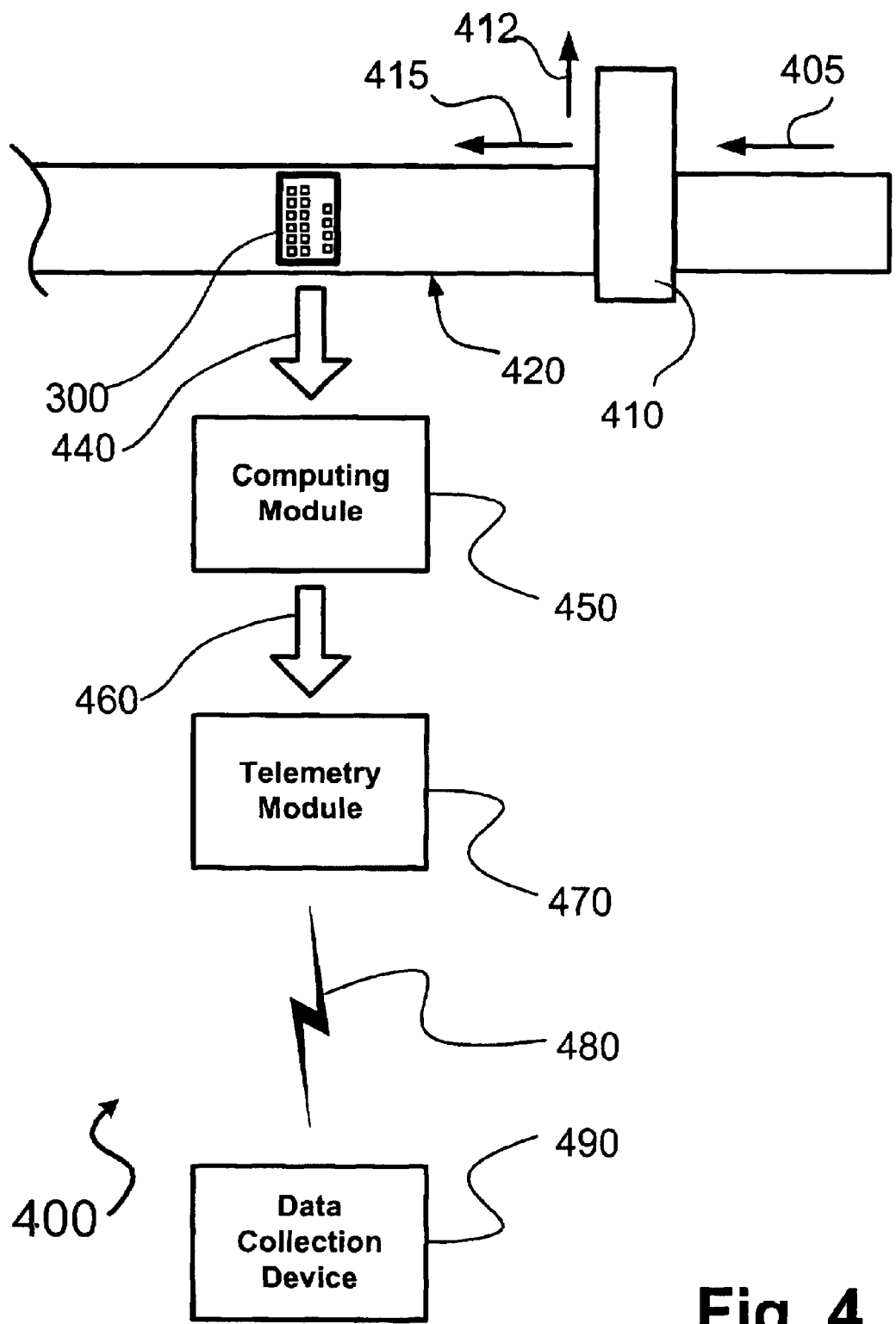
FIG. 4 is a block diagram of the measuring device of FIG. 3 and a system for collecting data yielded by the measuring device.

FIG. 4 is a block diagram of the measuring device 300 (FIG. 3) and a system 400 for collecting data yielded by the measuring device 300 in one presently preferred embodiment. The measuring device 300 is positioned within a pipeline 410 receiving the flow of fluid from a source of fluid 420. The source of fluid may contain a mixture of oil, water, gas, and or other substances. A gas separation device 430, which suitably is a gas liquid cylindrical cyclone separator or a comparable device, separates liquid from gas. The flow of fluid received from the source 410 passes by the measuring device 300 and continues flowing through the pipeline 420 routing the flow of fluid to a destination (not shown).

The measuring device 300 is coupled via a communication device 440 to a computing module 450. The communication device 440 suitably includes a plurality of conductors directly joining the sensors directly to the computing module 450. In this exemplary embodiment, output of the sensor arrays 305a–f (FIG. 3) and the other sensors 310, 312, 314, and 316 are represented by analog signals. Alternatively, an analog-to-digital converter (not shown) may be included within the measuring device 300 with an output of the analog-to-digital converter being coupled to the computing module 460. The digitized output of the sensors deployed in the measuring device 300 may be coupled to an interface, such as an RS232 interface, which is coupleable to a complementary connector on the computing module 460.

The computing module 460 digitizes and processes the analog signals or processes the digital signals from the sensor arrays 305a–f and other sensors 310, 312, 314, and 316 as previously described. The computing module 460 receives the capacitance and conductance signals from the plurality of sensor modules 305a–f. The computer module 460 uses the digital or digitized signals to determine the proportion of oil in the localized flows of fluid. The proportions of oil in the localized flows of fluid can be combined with output of the flow rate sensor 310 to calculate the total rate of flow of oil. The total rate of flow of oil can be adjusted for pressure, density, and temperature measurements taken of the flow of fluid as previously described.

An output of the computing module 460 is coupled through a suitable communications interface 470 to a telemetry module 480. The telemetry module 480 is used to communicate results of the measurements made by the measuring device 300 and/or calculations performed by the computing module 460 via a communications medium 490 to a data collection device 495 that advantageously can be remotely located from the flow of fluid being measured. At the data collection device 495, data can be reviewed to monitor the production or viability of the well without having to be present locally at the measuring device 300 to monitor the flow of fluid.

Many variations on the system 400 are possible. To name a few non-limiting examples, operators of the system might choose to directly monitor the capacitance and the conductance of one or more of the localized flows of fluid and have that data relayed to the data collection device 495. Sensors may be chosen that generate digital data, obviating use of the analog-to-digital converting circuit. Alternatively, the operators may wish to measure only the proportion of oil in the flow of fluid and communicate those signals from the measuring device 300 to the data collection device 495. Those measurements suitably are performed in hardware built into the measuring device 300 or within the computing module 460.

Alternatively, the operators of the system 400 may want information regarding the total rate of flow of oil with or without the localized capacitance, localized conductance, or localized proportion of oil in the localized flows of fluid data relayed to the data collection device 495. Similarly, the operators may want the total rate of flow of oil adjusted for one or more of pressure, density, and temperature, with or without the other data. Computations and adjustments suitably are made at the measuring device 300, in the computing module 460, at the data collection device 495, or at other locations as desired. Many permutations of the type of data communicated and where the data is received and/or manipulated are possible using embodiments of the present invention.

Similarly, different types of data communication systems suitably are used. The telemetry module 480 and the data communications network 490 could be a wired or wireless telemetry system configured to communicate with a remote data collection device 495. The data communications network 490 could be a telephone system, the Internet, a private Intranet, or another data network. Alternatively, the telemetry module 480 and the data communications network 490 could simply be a coupling and a cable to a nearby or on-site data collection device. The data may be communicated in real time or in batch mode. Again, many permutations are possible using embodiments of the present invention.

Figure 5:
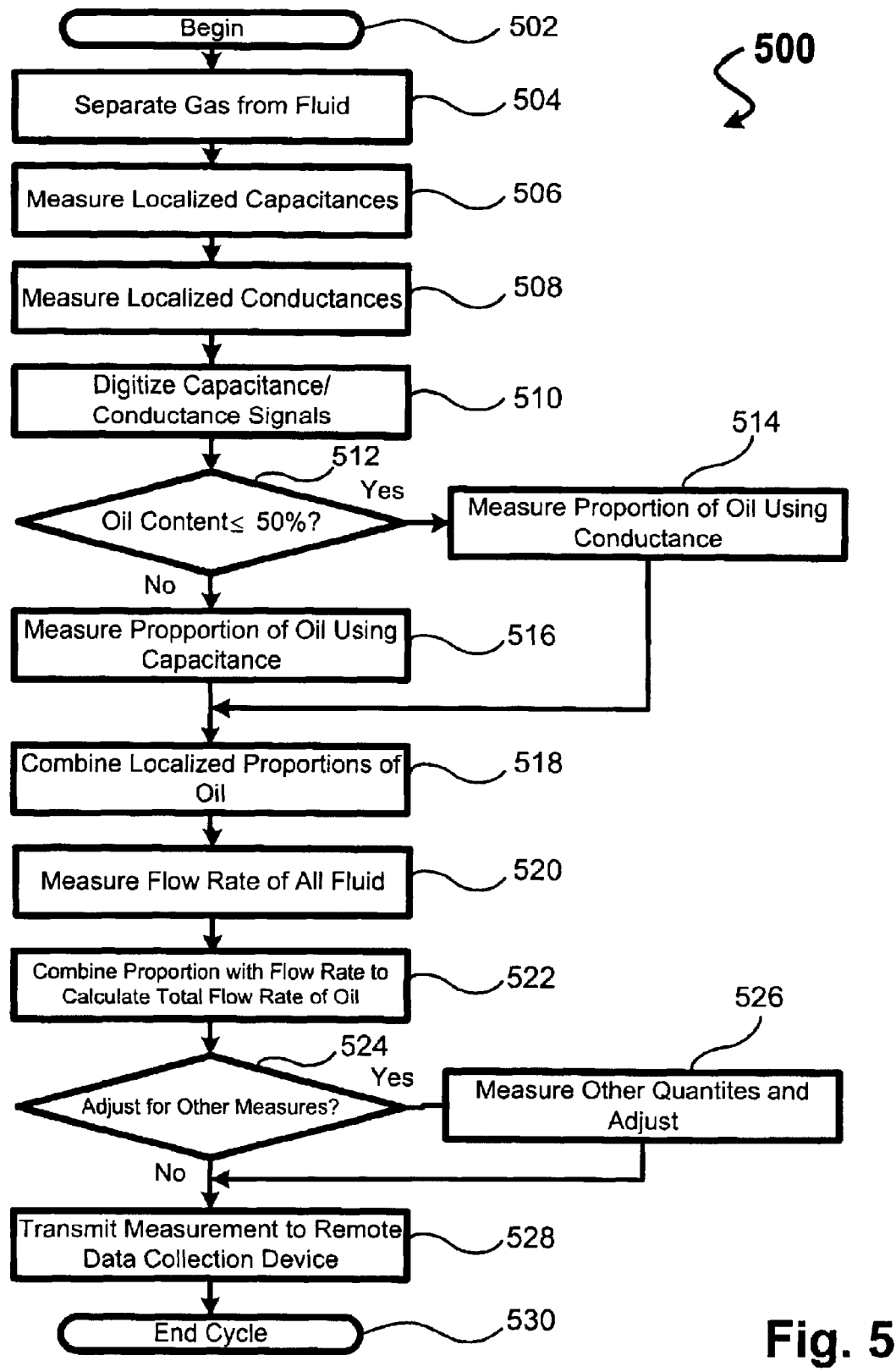
FIG. 5 is a flowchart of a routine using an embodiment of the present invention.

FIG. 5 is a flowchart of one presently preferred routine 500 using an embodiment of the present invention. In the routine 500, measurements for the localized flows are combined to yield a weighted total reading, although the measurements from the sensor arrays 305a–f (FIG. 3) could be used individually as previously described in connection with FIGS. 3 and 4.

The routine 500 begins at a block 502. At a block 504 gases are separated from the flow of fluid as previously described. At a block 506 the localized capacitances of the localized flows of fluid are measured. At a block 508 the localized conductances of the localized flows of fluid are measured. These measurements can take place simultaneously or in any order as desired. At a block 510 analog signals representing the localized capacitances and conductances measured at the blocks 506 and 508, respectively, are digitized. As previously described, if sensors providing digital outputs are used, no separate digitizing step will be involved.

At a decision block 512 for each of the sensor arrays 305a–f (FIG. 3), it is determined if the oil content is not more than approximately one-half of the flow of fluid. This determination can be made by using one of or both the localized capacitance and localized conductance measurements to roughly gauge the proportion of oil in the localized flow of fluid. If the localized flow of fluid includes not more than approximately one-half oil, at a block 514 the proportion of oil is calculated based on the localized conductance measured. On the other hand, if it is determined at the decision block 512 that the localized flow of fluid is approximately at least one-half oil, at a block 516 the proportion of oil is calculated based on the localized capacitance measured. Depending on the approximate determination of the proportion of oil made at the decision block 512, it may be desirable to use both the localized conductance and the localized capacitance and weigh the calculations yielded from both.

At a block 518 the localized proportions of oil measured for each sensor array 305a-5 at the blocks 514 and 516 are combined to generate a composite proportion of oil in the flow of fluid. At a block 520a flow rate of the fluid is measured. At a block 522, the composite proportion of oil is multiplied by the flow rate to calculate the total rate of flow of oil in the flow of fluid.

At a decision block 524 it is determined whether it is desired to adjust the calculation of the total rate of flow of oil for other measurements such as pressure, density, and temperature. Such a determination can be predetermined or made based on measurements of pressure, density, or temperature that transcend predetermined thresholds. If it is desired to adjust the total rate of flow of oil for these other measures, at a block 526 these other measurements are made and/or applied to adjust the total rate of flow of oil. Once the adjustments are made or if no adjustments are desired, at a block 528 the resulting data is transmitted to a data collection device. The routine 500 ends at a block 530. The routine 500 could be repeated continually, at intervals, on demand, or as otherwise desired.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. An apparatus for measuring an amount of oil in a flow of fluid having a depth, the apparatus comprising:
   a support structure configured to be submerged in a flow of fluid and to support a plurality of sensors; and
   a plurality of sensor arrays disposed on the support structure, each of the sensor arrays being disposed at positions corresponding to varying depths of the flow of fluid and being configured to measure properties of a localized flow of fluid, each of the sensor arrays including:
      a capacitance sensor being configured to respond to a localized capacitance of the localized flow of fluid adjacent to the capacitance sensor, the capacitance sensor being coupled to a pair of conductors; and
      a conductance sensor configured to measure a localized conductance of the localized flow of fluid, the conductance sensor being configured to generate a conductance signal.

2. The apparatus of claim 1, wherein the support structure is generally planar.

3. The apparatus of claim 1, further comprising a control module operably coupled to the pair of conductors from each of the sensor arrays and being configured to measure the localized capacitance of the localized flow of fluid from each of the sensor arrays, the control module being further configured to generate a capacitance signal representative of the localized capacitance of the localized flow of fluid for each of the sensor arrays.

4. The apparatus of claim 3, further comprising an analog-to-digital converting circuit configured to receive the capacitance signal representative of the localized capacitance of the localized flow of fluid for each of the sensor arrays and convert the capacitance signal to a first digital signal, the analog-to-digital converting circuit being further configured to receive the conductance signal representative of the localized conductance of the localized flow of fluid for each of the sensor arrays and convert the conductance signal to a second digital signal.

5. The apparatus of claim 4, wherein the control module further comprises at least one interface configured to communicate a plurality of first digital signals and a plurality of second digital signals.

6. The apparatus of claim 5, wherein the at least one interface includes an RS-232 interface.

7. The apparatus of claim 5, further comprising a first telemetry module configured to receive the plurality of first and second digital signals and communicate the plurality of first and second digital signals to a data collection system.

8. The apparatus of claim 7, further comprising a computing module configured to receive the plurality of first and second digital signals and compute a localized relative amount of oil in each of the localized flows of fluid corresponding with each of the sensor arrays.

9. The apparatus of claim 8, wherein the computing module is configured to use the first digital signal to calculate the localized relative amount of oil in the localized flow of fluid when at least one of the first and second digital signals indicates that approximately not less than one-half of the localized flow of fluid includes oil, and to use the second digital signal to calculate the localized relative amount of oil in the localized flow of fluid when one of the first and second digital signals indicate that approximately not more than one-half of the localized flow of fluid includes oil.

10. The apparatus of claim 9, further comprising at least one flow rate sensor disposed on the support structure, the at least one flow rate sensor being configured to measure a total rate of the flow of fluid passing the apparatus and generate a flow rate.

11. The apparatus of claim 10, wherein the computing module is further configured to generate a composite proportion of oil in the flow of fluid by totaling the localized relative amount of oil for each of the sensor arrays and combine the composite proportion of oil with the flow rate for calculating a total amount of oil in the flow of fluid.

12. The apparatus of claim 11, further comprising a second telemetry module configured to communicate the total amount of oil in the flow of fluid to the data collection system.

13. The apparatus of claim 11, further comprising at least one additional fluid property sensor disposed on the support structure, the at least one additional fluid property sensor being configured to measure an additional fluid property of the flow of fluid.

14. The apparatus of claim 13, wherein the computing module is further configured to combine the fluid property signal with the total amount of oil in the flow of fluid for calculating an adjusted total amount of oil in the flow of fluid.

15. The apparatus of claim 14, further comprising a third telemetry module configured to communicate the adjusted total amount of oil in the flow of fluid to the data collection system.

16. The apparatus of claim 13, wherein the at least one additional fluid property sensor includes a pressure sensor configured to measure a pressure of the flow of fluid and the fluid property signal generated includes a fluid pressure signal.

17. The apparatus of claim 13, wherein the at least one additional fluid property sensor includes a density sensor configured to measure a density of the flow of fluid and the fluid property signal includes a fluid density signal.

18. The apparatus of claim 16, wherein the density sensor includes a nuclear density sensor.

19. The apparatus of claim 13, wherein the at least one additional fluid property sensor includes a temperature sensor configured to measure a temperature of the flow of fluid and the fluid property signal includes a temperature signal.

20. The apparatus of claim 1, wherein the support structure includes a circuit board.

21. A system for measuring an amount of oil in a flow of fluid, the system comprising:
- a support structure configured to be submerged in a flow of fluid and to support a plurality of sensors;
- a plurality of sensor arrays disposed on the support structure, each of the sensor arrays being disposed at positions corresponding to varying depths of the flow of fluid and being configured to measure properties of a localized flow of fluid, each of the sensor arrays including:
  - a capacitance sensor being configured to respond to a localized capacitance of the localized flow of fluid adjacent to the capacitance sensor, the capacitance sensor being coupled to a pair of conductors; and
  - a conductance sensor configured to measure a localized conductance of the localized flow of fluid, the conductance sensor being configured to generate a conductance signal;
- a control module operably coupled to the pair of conductors from each of the sensor arrays and being configured to measure the localized capacitance of the localized flow of fluid from each of the sensor arrays, the control module being further configured to generate a capacitance signal representative of the localized capacitance of the localized flow of fluid for each of the sensor arrays;
- an analog-to-digital converting circuit configured to receive the capacitance signal representative of the localized capacitance of the localized flow of fluid for each of the sensor arrays and convert the capacitance signal to a first digital signal, the analog-to-digital converting circuit being further configured to receive the conductance signal representative of the localized conductance of the localized flow of fluid for each of the sensor arrays and convert the conductance signal to a second digital signal;
- a computing module configured to receive the plurality of first and second digital signals and compute a localized relative amount of oil in each of the localized flows of fluid corresponding with each of the sensor arrays; and
- an interface configured to communicate a plurality of first digital signals and a plurality of second digital signals.

22. The system of claim 21, wherein the support structure is generally planar.

23. The system of claim 21, wherein the at least one interface includes an RS-232 interface.

24. The system of claim 21, further comprising a first telemetry module configured to receive the localized relative amount of oil in each of the localized flows of fluid corresponding with each of the sensor arrays and communicate the localized relative amount of oil in each of the localized flows of fluid to a data collection system.

25. The system of claim 21, wherein the computing module is configured to use the first digital signal to calculate the localized relative amount of oil in the localized flow of fluid when at least one of the first and second digital signals indicates that approximately not less than one-half of the localized flow of fluid includes oil, and to use the second digital signal to calculate the localized relative amount of oil in the localized flow of fluid when one of the first and second digital signals indicate that approximately not more than one-half of the localized flow of fluid includes oil.

26. The system of claim 25, further comprising at least one flow rate sensor disposed on the support structure, the at least one flow rate sensor being configured to measure a total rate of the flow of fluid passing the support structure and generate a flow rate.

27. The system of claim 26, wherein the computing module is further configured to generate a composite proportion of oil in the flow of fluid by totaling the localized relative amount of oil for each of the sensor arrays and combine the composite proportion of oil with the flow rate for calculating a total amount of oil in the flow of fluid.

28. The system of claim 27, further comprising a second telemetry module configured to communicate the total amount of oil in the flow of fluid to the data collection system.

29. The system of claim 27, further comprising at least one additional fluid property sensor disposed on the support structure, the at least one additional fluid property sensor being configured to measure an additional fluid property of the flow of fluid.

30. The system of claim 29, wherein the computing module is further configured to combine the fluid property signal with the total amount of oil in the flow of fluid for calculating an adjusted total amount of oil in the flow of fluid.

31. The system of claim 30, further comprising a third telemetry module configured to communicate the adjusted total amount of oil in the flow of fluid to the data collection system.

32. The system of claim 29, wherein the at least one additional fluid property sensor includes a pressure sensor configured to measure a pressure of the flow of fluid and the fluid property signal generated includes a fluid pressure signal.

33. The system of claim 29, wherein the at least one additional fluid property sensor includes a density sensor configured to measure a density of the flow of fluid and the fluid property signal includes a fluid density signal.

34. The system of claim 33, wherein the density sensor includes a nuclear density sensor.

35. The system of claim 29, wherein the at least one additional fluid property sensor includes a temperature sensor configured to measure a temperature of the flow of fluid and the fluid property signal includes a temperature signal.

36. The system of claim 21, wherein the support structure includes a circuit board.

37. A system for measuring an amount of oil in a flow of fluid, the system comprising:
- a support structure configured to be submerged in a flow of fluid and to support a plurality of sensors;
- a plurality of sensor arrays disposed on the support structure, each of the sensor arrays being disposed at positions corresponding to varying depths of the flow of fluid and being configured to measure properties of a localized flow of fluid, each of the sensor arrays including:
  - a capacitance sensor being configured to respond to a localized capacitance of the localized flow of fluid adjacent to the capacitance sensor, the capacitance sensor being coupled to a pair of conductors; and
  - a conductance sensor configured to measure a localized conductance of the localized flow of fluid, the conductance sensor being configured to generate a conductance signal;
- a flow rate sensor disposed on the support structure, the flow rate sensor being configured to measure a total rate of the flow of fluid and generate a flow rate;
- a control module operably coupled to the pair of conductors from each of the sensor arrays and being configured to measure the localized capacitance of the localized flow of fluid from each of the sensor arrays, the control module being further configured to generate a capacitance signal representative of the localized capacitance of the localized flow of fluid for each of the sensor arrays;

an analog-to-digital converting circuit configured to receive the capacitance signal representative of the localized capacitance of the localized flow of fluid for each of the sensor arrays and convert the capacitance signal to a first digital signal, the analog-to-digital converting circuit being further configured to receive the conductance signal representative of the localized conductance of the localized flow of fluid for each of the sensor arrays and convert the conductance signal to a second digital signal;

a computing module configured to receive the plurality of first and second digital signals and compute a localized relative amount of oil in each of the localized flows of fluid corresponding with each of the sensor arrays, the computing module being further configured to generate a composite proportion of oil in the flow of fluid by totaling the localized relative amount of oil for each of the sensor arrays and combine the composite proportion of oil with the flow rate for calculating a total amount of oil in the flow of fluid; and an interface configured to receive the total amount of oil in the flow of fluid and communicate the total amount of oil in the flow of fluid to a remote data collection system.

38. The system of claim 37, wherein the support structure is generally planar.

39. The system of claim 37, wherein the at least one interface includes an RS-232 interface.

40. The system of claim 37, wherein the computing module is configured to use the first digital signal to calculate the localized relative amount of oil in the localized flow of fluid when at least one of the first and second digital signals indicates that approximately not less than one-half of the localized flow of fluid includes oil, and to use the second digital signal to calculate the localized relative amount of oil in the localized flow of fluid when one of the first and second digital signals indicate that approximately not more than one-half of the localized flow of fluid includes oil.

41. The system of claim 37, further comprising a first telemetry module configured to communicate the total amount of oil in the flow of fluid to a data collection system.

42. The system of claim 37, further comprising at least one additional fluid property sensor disposed on the support structure, the at least one additional fluid property sensor being configured to measure an additional fluid property of the flow of fluid.

43. The system of claim 42, wherein the computing module is further configured to combine the fluid property signal with the total amount of oil in the flow of fluid for calculating an adjusted total amount of oil in the flow of fluid.

44. The system of claim 43, further comprising a second telemetry module configured to communicate the adjusted total amount of oil in the flow of fluid to the data collection system.

45. The system of claim 42, wherein the at least one additional fluid property sensor includes a pressure sensor configured to measure a pressure of the flow of fluid and the fluid property signal generated includes a fluid pressure signal.

46. The system of claim 42, wherein the at least one additional fluid property sensor includes a density sensor configured to measure a density of the flow of fluid and the fluid property signal includes a fluid density signal.

47. The system of claim 46, wherein the density sensor includes a nuclear density sensor.

48. The system of claim 42, wherein the at least one additional fluid property sensor includes a temperature sensor configured to measure a temperature of the flow of fluid and the fluid property signal includes a temperature signal.

49. The system of claim 37, wherein the support structure includes a circuit board.

50. A method for measuring an amount of oil in a flow of fluid, the method comprising:

measuring a localized capacitance of a localized flow of fluid at a plurality of depths of a flow of fluid;

measuring a localized conductance of the localized flow of fluid at the plurality of depths of the flow of fluid;

calculating a localized relative amount of oil in the localized flow of fluid using the localized capacitance of the localized flow of fluid when at least one of the localized capacitance and the localized conductance indicates that approximately not less than one-half of the localized flow of fluid includes oil and calculating the localized relative amount of oil in the localized flow of fluid using the localized conductance when at least one of the localized capacitance and the localized conductance indicates that approximately not more than one-half of the flow of fluid includes oil.

51. The method of claim 50, further comprising communicating the localized relative amount of oil in the flow of fluid to a data collection system.

52. The method of claim 50, further comprising calculating from the localized capacitance signals and the localized conductance signals a composite proportion of oil in the flow of fluid.

53. The method of claim 52, further comprising measuring a rate of flow of fluid.

54. The method of claim 53, further comprising calculating a total amount of oil in the flow of fluid by combining the rate of flow of fluid with the composite proportion of oil in the flow of fluid.

55. The method of claim 54, further comprising communicating the total amount of oil in the flow of fluid to the data collection system.

56. The method of claim 54, further comprising measuring at least one additional fluid property of the flow of fluid.

57. The method of claim 56, further comprising calculating an adjusted total amount of oil in the flow of fluid by combining the total amount of oil in the flow of fluid with the additional property of the flow of fluid.

58. The method of claim 57, further comprising communicating the adjusted total amount of oil in the flow of fluid to the data collection system.

59. The method of claim 56, wherein the at least one additional fluid property includes fluid pressure.

60. The method of claim 56, wherein the at least one additional fluid property includes fluid density.

61. The method of claim 56, wherein the at least one additional fluid property includes fluid temperature.

62. The method of claim 50, further comprising separating gas from the flow of fluid.

63. The method of claim 50, further comprising inserting in the flow of fluid a circuit board supporting an array of sensors, each array of sensors being configured to measure the localized capacitance of the localized flow of fluid at a plurality of depths of a flow of fluid and being further configured to measure the localized conductance of the localized flow of fluid at the plurality of depths of the flow of fluid.

64. A method for measuring an amount of oil in a flow of fluid, the method comprising:

measuring a localized capacitance of a localized flow of fluid at a plurality of depths of a flow of fluid;

measuring a localized conductance of the localized flow of fluid at the plurality of depths of the flow of fluid;

measuring a rate of flow of fluid;

calculating a localized relative amount of oil in the localized flow of fluid using the localized capacitance of the localized flow of fluid when at least one of the localized capacitance and the localized conductance indicates that approximately not less than one-half of the localized flow of fluid includes oil and calculating the localized relative amount of oil in the localized flow of fluid using the localized conductance when at least one of the localized capacitance and the localized conductance indicates that approximately not more than one-half of the flow of fluid includes oil;

calculating from the localized capacitance signals and the localized conductance signals a composite proportion of oil in the flow of fluid; and calculating a total amount of oil in the flow of fluid by combining the rate of flow of fluid with the composite proportion of oil in the flow of fluid.

65. The method of claim 64, further comprising communicating the total amount of oil in the flow of fluid to the data collection system.

66. The method of claim 64, further comprising measuring at least one additional fluid property of the flow of fluid.

67. The method of claim 66, further comprising calculating an adjusted total amount of oil in the flow of fluid by combining the total amount of oil in the flow of fluid with the additional property of the flow of fluid.

68. The method of claim 67, further comprising communicating the adjusted total amount of oil in the flow of fluid to the data collection system.

69. The method of claim 66, wherein the at least one additional fluid property includes fluid pressure.

70. The method of claim 66, wherein the at least one additional fluid property includes fluid density.

71. The method of claim 66, wherein the at least one additional fluid property includes fluid temperature.

72. The method of claim 64, further comprising separating gas from the flow of fluid.

73. The method of claim 64, further comprising inserting in the flow of fluid a circuit board supporting an array of sensors, each array of sensors being configured to measure the localized capacitance of the localized flow of fluid at a plurality of depths of a flow of fluid and being further configured to measure the localized conductance of the localized flow of fluid at the plurality of depths of the flow of fluid.

* * * * *